(12) United States Patent
Heiland

(10) Patent No.: US 8,387,958 B2
(45) Date of Patent: Mar. 5, 2013

(54) VIBRATION ISOLATOR FOR USE IN A VACUUM

(75) Inventor: Peter Heiland, Raunheim (DE)

(73) Assignee: Integrated Dynamics Engineering GmbH (DE)

( * ) Notice: Subject to any disclaimer, the term of this patent is extended or adjusted under 35 U.S.C. 154(b) by 471 days.

(21) Appl. No.: 12/330,192

(22) Filed: Dec. 8, 2008

(65) Prior Publication Data

US 2009/0146352 A1 Jun. 11, 2009

(30) Foreign Application Priority Data

Dec. 10, 2007 (DE) .................. 10 2007 059 631

(51) Int. Cl.
*F16F 9/02* (2006.01)

(52) U.S. Cl. .................. 267/140.11; 248/562

(58) Field of Classification Search .......... 267/136, 267/137, 140.11, 122; 248/560, 562, 636, 248/638; 417/363, 423.15; 60/407, 412
See application file for complete search history.

(56) References Cited

U.S. PATENT DOCUMENTS

| 5,060,959 | A  | * | 10/1991 | Davis et al. ............... 267/64.24 |
| 7,095,482 | B2 | * | 8/2006 | Phillips et al. ............... 248/562 |
| 2004/0032064 | A1 | * | 2/2004 | Jackson ............... 267/64.11 |
| 2005/0248072 | A1 | * | 11/2005 | Ben-Maimon ............... 267/137 |

FOREIGN PATENT DOCUMENTS

| JP | 09100869 A | * | 4/1997 |
| JP | 2004-071818 A | | 3/2004 |
| JP | 2004-124745 A | | 4/2004 |
| JP | 2004134745 A | | 4/2004 |
| JP | 2005106166 A | | 4/2005 |
| JP | 2005282696 A | | 10/2005 |
| JP | 2006283966 A | | 10/2006 |
| JP | 2007-024313 A | | 2/2007 |

OTHER PUBLICATIONS

"Japanese Office Action for Japanese International Application No. JP-2008-314116", Nov. 22, 2010, Publisher: Japanese Patent Office, Published in: JP.
Perard, D., "DE Application No. 10 2007 059 631.8 Office Action Sep. 9, 2008", , Publisher: DPMA, Published in: DE.
Ichinose, Satoru, "JP Application No. 2008-314116 Office Action Feb. 28, 2012", , Publisher: JPO, Published in: JP.

* cited by examiner

*Primary Examiner* — Thomas J Williams
(74) *Attorney, Agent, or Firm* — Kaplan Breyer Schwarz & Ottensen, LLP

(57) ABSTRACT

The invention relates to a vibration isolator for use in a vacuum in which mechanical and electrical modules are arranged within a fluid-tight chamber.

9 Claims, 4 Drawing Sheets

VIBRATION ISOLATOR FOR USE IN A VACUUM

The invention relates to a vibration isolator and also to an arrangement with a vibration isolator.

BACKGROUND OF THE INVENTION

Vibration isolators are known. Such isolators, like those used, for example, for lithography equipment, typically comprise an open or closed pneumatic spring that advantageously has a low resonance frequency both vertically and also horizontally.

High isolation effects can be achieved with such isolators.

In addition to a pneumatic spring, usually other components, such as motors for horizontal and/or vertical adjustments, sensors, or actuators, are integrated into such vibration isolators, in order to actively influence the system.

A vibration isolation system is described, for example, in European Patent No. EP 0 927 380 B1. The European Patent Application No. EP 1 803 963 describes an air bearing that is active horizontally and vertically.

The type-defining devices described in the preceding documents are referenced in their entirety.

In the course of advancing miniaturization in semiconductor technology, it is increasingly necessary to perform the production of semiconductor components at least partially in a vacuum. Only in this way can, for example, very small chip structures be imaged with the required accuracy. Also, vacuum technologies are in part used in the production of displays, in particular, a production can take place not only in closed vacuum chambers, but also in a so-called open vacuum.

Notwithstanding the vacuum, the equipment that is used is extremely sensitive to vibrations that can also propagate through the floor to the equipment. Such machines, such as wafer exposure machines, are therefore supported in a vibration-isolated way.

The use of known vibration isolators, in particular, encapsulated air bearings, has the disadvantage that peripheral components, such as electrical feed lines, electronic control modules, sensors, or feed lines for the supply of coolant are now exposed to vacuum conditions.

Therefore, for one, the peripheral components must be rated specially for vacuum conditions, so that damage is not generated, for example, in electrical components due to the strongly reduced sparkover voltages at certain pressures.

Production-caused inclusions of air bubbles, such as, for example, in components encased in resin, can also lead to damage.

In addition, in vacuum, the heat dissipation of components is realized nearly exclusively by means of heat irradiation and heat conduction. Thus, adjacent equipment can be disrupted, or the component in question can overheat.

Also, the necessary cable and fluid feedthroughs cause leakage that contaminates the vacuum.

TASK OF THE INVENTION

Consequently, the invention is based on the task of disclosing an arrangement or a system with a vibration isolator in which the mentioned disadvantages of the state of the art are at least reduced.

One task of the invention is, in particular, to eliminate the design of electrical and/or mechanical peripheral components, such as sensors, actuators, etc., for vacuum conditions.

Another task of the invention is to improve the cooling of active components, such as motors, actuators, and electrical controllers.

Another task of the invention is to reduce leakage caused by a vibration isolator in a vacuum system.

In particular, the leakage between an isolator housing and a vacuum chamber should be reduced.

The task of the invention is already solved by a vibration isolator alone according to one of the independent claims and also by an arrangement with a vibration isolator.

Preferred embodiments and improvements of the invention are to be taken from each of the subordinate claims.

Accordingly, a vibration isolator for use in a vacuum is provided. In the sense of the invention, a vacuum is understood to be any low pressure below ambient pressure, that is, a range from a low vacuum to an ultra-high vacuum.

The vibration isolator comprises a spring that is advantageously constructed as a pneumatic spring. The spring comprises an essentially fluid-tight chamber that forms, in particular, the working chamber of a pneumatic spring. If the spring is constructed as a pneumatic spring, it advantageously involves a pneumatic spring enclosed, in particular, by an expansion bellows. In one alternative embodiment of the invention, however, an open air bearing with a low leakage rate can also be used.

According to the invention, at least one electrical module, one electronic module, one mechanical or magnetic spring, and/or at least one fluid inlet are arranged in the fluid-tight chamber. In one embodiment of the present invention, the mechanical spring involves a leaf spring.

Advantageously, therefore, peripheral modules that are functional components of the vibration isolator are arranged in the fluid-tight chamber.

However, it is also conceivable to arrange components that are not in direct connection with the vibration isolator in the fluid-tight chamber.

An overpressure prevails in the fluid-tight chamber relative to the vacuum, so that the corresponding modules or components do not have to be designed for use in a vacuum.

Simultaneously, the fluid-tight chamber advantageously forms a work chamber of the vibration isolator.

The electronic modules can be, for example, sensors, such as position sensors, acceleration sensors, or geophones.

In addition, they could be actuators, such as electromagnets, motors, in particular, linear motors.

However, the integration of other mechanical components is also conceivable, in particular, springs, articulated swivels, etc., that are also functional elements of the vibration isolator.

In a preferred embodiment of the invention, an overpressure of more than 0.3 bar, advantageously of more than 0.8 bar, and especially preferably of more than 1 bar prevails in the fluid-tight chamber relative to the surrounds, in particular, relative to the vacuum. Additionally, an overpressure from 0.5 bar to 15 bar prevails in the fluid-tight chamber relative to atmospheric pressure.

It has been shown that components designed for normal pressure can often be used without additional structural measures at overpressures of up to 8 bar, or can be protected from pressure at relatively little expense.

An overpressure of up to 8 bar usually places no special requirements on the materials of the components.

For example, the air on the one hand acts as an insulator, and on the other hand good cooling of the appropriate components can be achieved through convection of the air.

In one preferred embodiment of the invention, the vibration isolator has at least one fluid inlet, in particular, it has a fluid inlet for cooling water or air, wherein the electrical or electronic modules arranged in the fluid-tight chamber can be cooled at least partially by means of the fluid.

The vibration isolator constructed advantageously as a pneumatic spring can at the same time be operated by means of the fluid provided for cooling.

The invention further relates to a vibration isolator that comprises a spring with an essentially fluid-tight chamber, for use in a vacuum.

According to the invention, the essentially fluid-tight chamber is sealed from the surrounding vacuum by means of at least two seals arranged one after the other, wherein at least one fluid line leads into the region between the seals. A low pressure relative to the fluid-tight chamber can be generated by means of the fluid line via a vacuum pump.

Therefore, from the standpoint of the vacuum chamber, a low pressure can already be generated after the first seal. Advantageously, only a relatively small pressure difference exists between the second seal and the vacuum.

It has been shown that a seal that is indeed constructed only for use at low pressure differences but has an extremely low leakage rate can be used as the second vacuum-side seal.

The first seal, that is, the seal facing the fluid-tight chamber, is constructed, in contrast, for high pressure differences but, in contrast, has a higher leakage rate compared with the second vacuum-side seal.

Advantageously, the pressure difference behind the second vacuum-side seal compared with the vacuum lies at a maximum of 0.6, advantageously 0.4, and especially preferably at a maximum of 0.1 bar.

In contrast, the pressure difference compared with the fluid-tight chamber at an overpressure equals at least 1, advantageously at least 3, and especially preferably at least 5 bar.

The invention also relates to an arrangement with a vibration isolator, wherein the vibration isolator is arranged in a vacuum chamber.

The vacuum chamber and/or vibration isolator are here provided with fluid feedthroughs or electrical feedthroughs that lead to the fluid-tight chamber.

In this way, for example, sensors, actuators, and other electrical components can be controlled via electrical feedthroughs.

Via fluid feedthroughs, for example, air can be conducted for operation as a pneumatic spring or a cooling fluid.

Here it is advantageous, in particular, for the fluid feedthroughs and electrical feedthroughs to terminate in the fluid-tight chamber, that is, they do not need to be led farther into the vacuum region. In this way, the rate of leakage caused by the vibration isolator in a vacuum system can be considerably reduced.

BRIEF DESCRIPTION OF THE DRAWINGS

The invention will be explained in greater detail below with reference to the drawings of FIGS. 1-4.

DETAILED DESCRIPTION OF THE DRAWINGS

Figure 1:
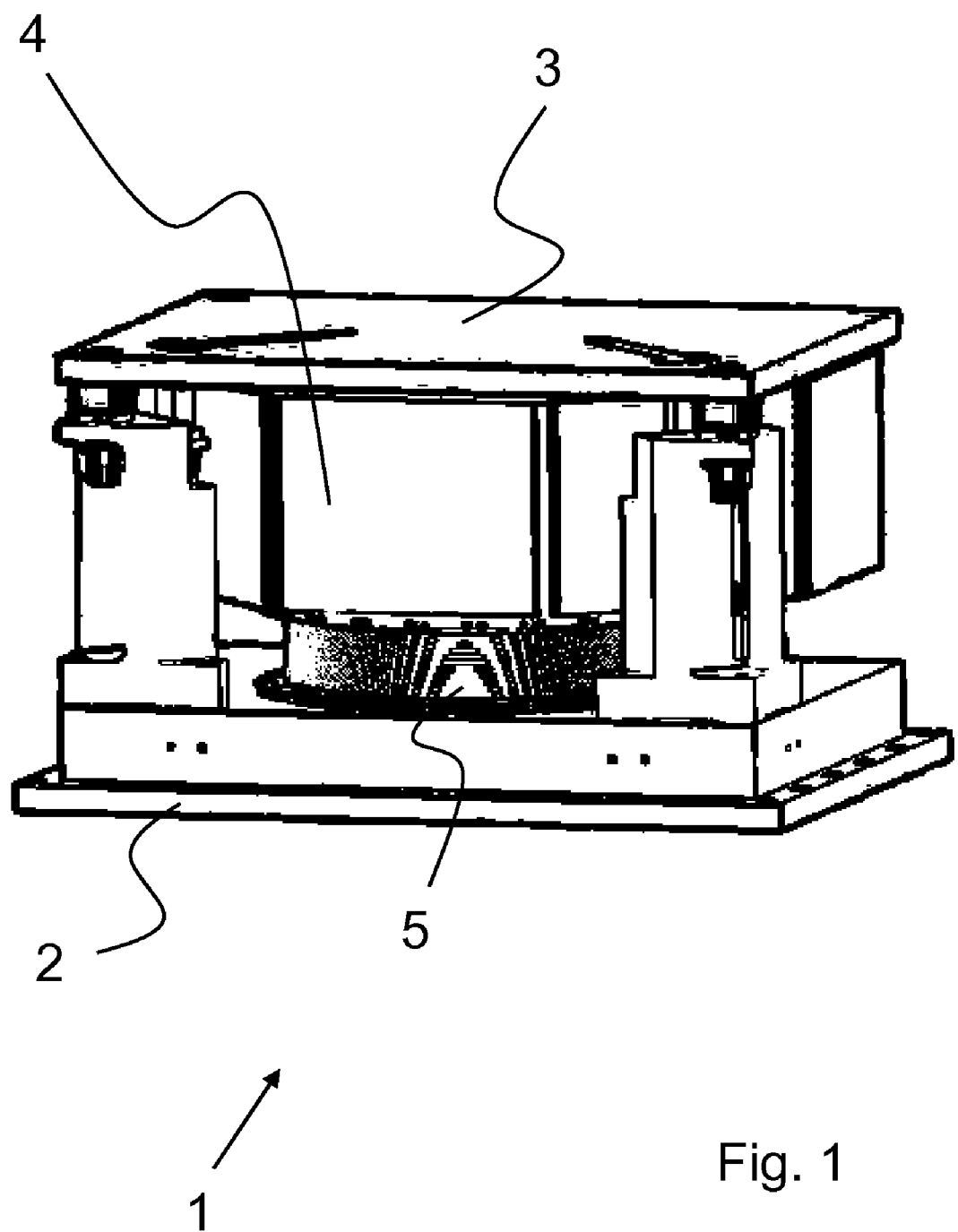
FIG. 1 shows a schematic side view of an embodiment of a vibration isolator.

With reference to FIG. 1 the essential components of a vibration isolator 1 will be explained in greater detail with reference to a schematic diagram.

The vibration isolator 1 comprises a base 2 and also a plate 3 on which a load (not shown) can be supported in a vibration-isolated way.

Between the base 2 and the plate 3 there is a spring that is constructed in this embodiment as a pneumatic spring. The spring 4 comprises a working chamber with an expansion bellows 5, and thus forms an essentially fluid-tight chamber. Thus, the spring 4 constructed as a pneumatic spring involves a closed pneumatic spring.

Such pneumatic springs have the advantage of a low resonance frequency and can be designed as simultaneously vertically and horizontally effective.

Figure 2:
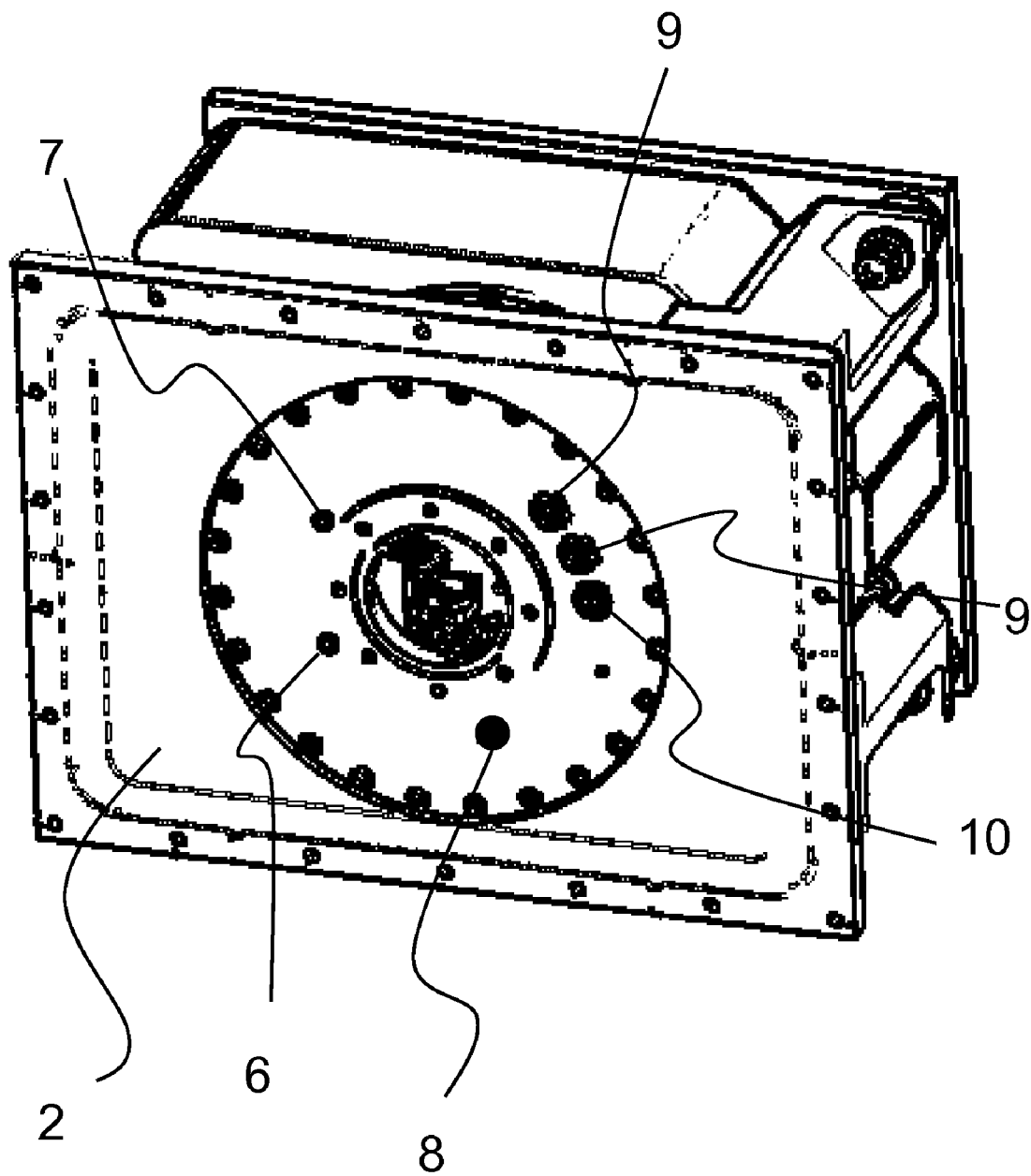
FIG. 2 shows schematically a vibration isolator from below.

FIG. 2 shows a schematic rear view of the vibration isolator shown in FIG. 1.

Seen here is the base 2 on which the various inlets for peripheral components for operating the vibration isolator are mounted.

Thus, there is a cooling-water inlet 6 and also a cooling-water outlet 7 in the base by means of which electrical and electronic components arranged in the fluid-tight chamber can be cooled.

Furthermore, an air inlet 8 is provided by means of which the spring 4 constructed as a pneumatic spring can be supplied with operating pressure.

In addition, there are also terminals for sensors 9 and also a terminal for an actuator 10.

The electrical lines and fluid lines available thus lead directly into the fluid-tight chamber for the vibration isolator 1 that can be installed in a vacuum chamber. If the vibration isolator 1 is mounted with its base 2 in a vacuum chamber, only the base 2 needs to be sealed relative to the vacuum chamber (not shown).

Additional feedthroughs for peripheral modules of the vibration isolation mount 1 are not required in the vacuum chamber.

In this way, the leakage rate of the vacuum system caused by the vibration isolation mount 1 can be reduced. In addition, in this embodiment the electrical and mechanical modules, such as actuators, sensors, motors, etc., arranged in the fluid-tight chamber defined by the pneumatic spring do not need to be rated for use in a vacuum, and can be cooled in a significantly simpler way by means of the supply of cooling water or cooling air.

Figure 3:
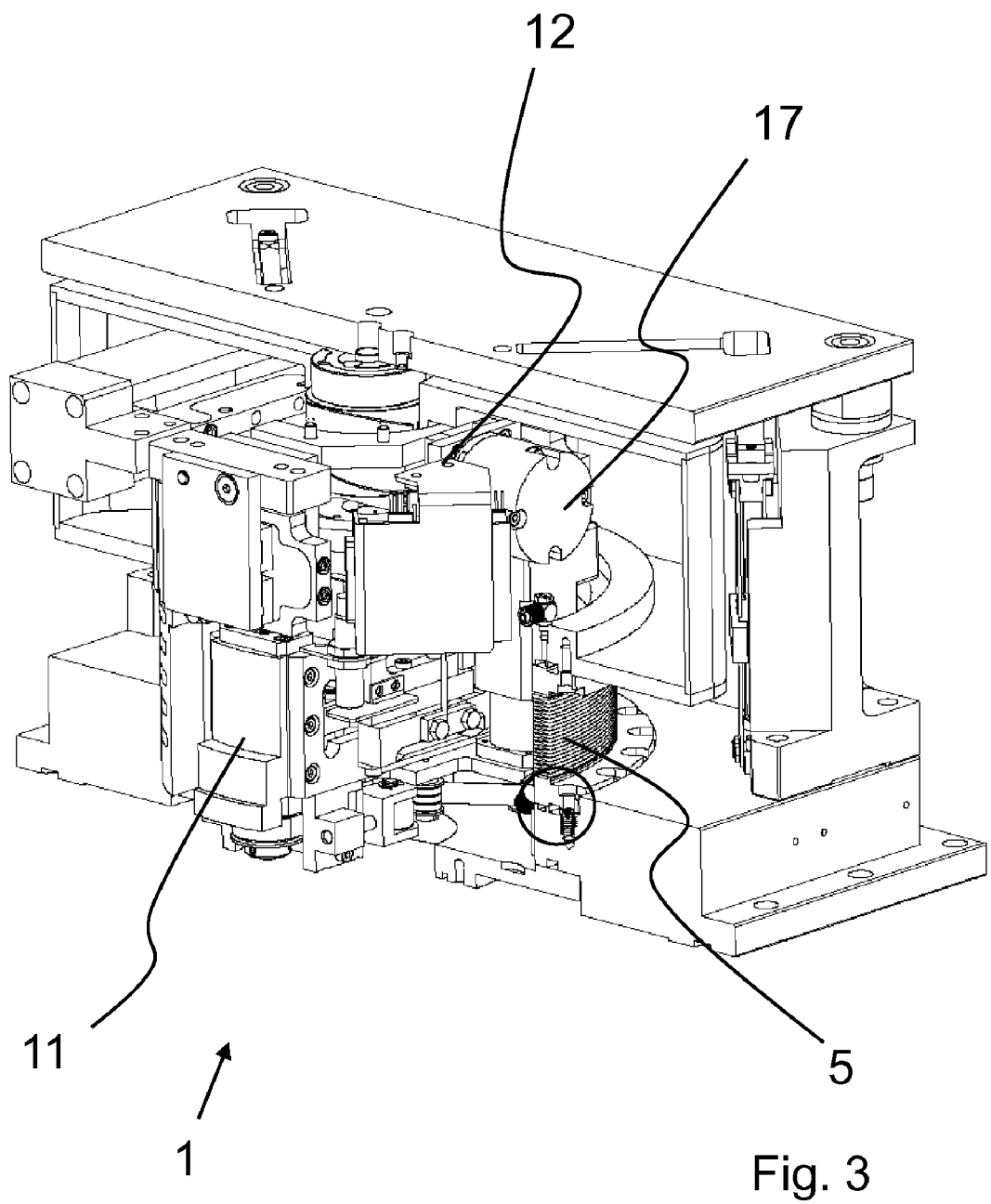
FIG. 3 shows a schematic, partially broken-away isometric view of a vibration isolator.

FIG. 3 is an isometric view of a vibration isolator that is shown in a partially broken away state.

In this diagram, in particular, the fluid-tight chamber is broken away. Thus, the expansion bellows 5 is to be seen only in the rear area and is erased in the front area, so that the modules arranged in the fluid-tight chamber can be seen.

In this embodiment, there is a motor 11 in the fluid-tight chamber by means of which the vibration isolation mount 1 can be calibrated with respect to height.

In addition, there is a sensor module 12 in the fluid-tight chamber with at least two position sensors (not shown) for each spatial direction. In particular, a geophone 15 is also provided for detecting vibrations caused by earth tremors.

Figure 4:
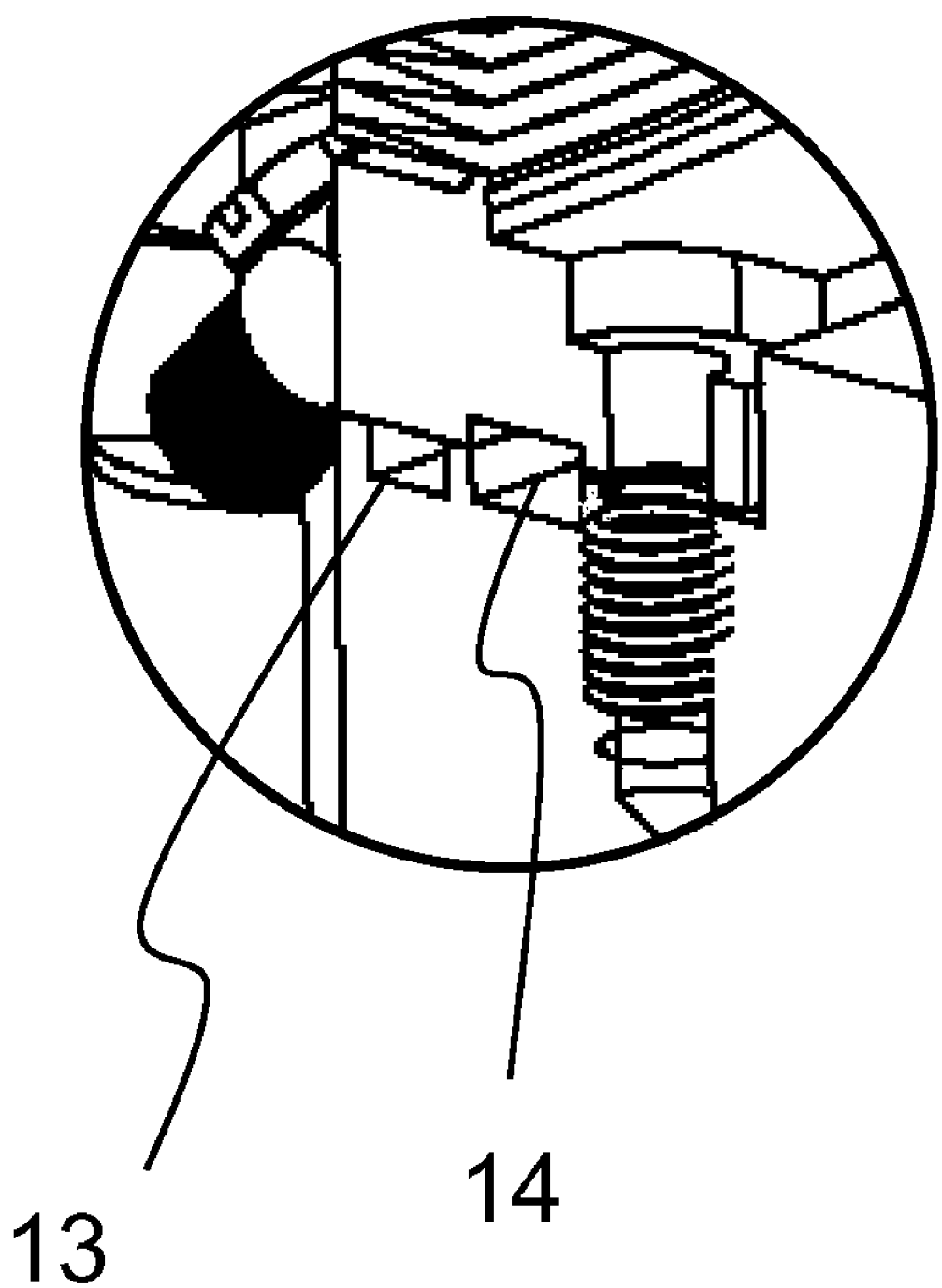
FIG. 4 shows a detail view.

FIG. 4 shows a detail view taken from FIG. 3, with reference to which the seal of the fluid-tight chamber relative to the vacuum shall be explained in greater detail.

Two seals, the seals 13 and 14, are provided for forming the seal.

In this embodiment, the pressure-side seal 13 is advantageously constructed as an O-ring.

The vacuum-side seal 14 involves a seal with a low leakage rate that displays its effect, however, only for relatively small pressure differences.

Therefore, by means of a fluid line that can be constructed arbitrarily (not shown), the chamber between the vacuum-side seal 14 and the pressure-side seal 13 is pumped down, so that a vacuum already exists between the seals 13 and 14.

Through this arrangement, it was possible to further reduce the leakage rate caused by the vibration isolator.

It is understood that the invention is not limited to a combination of previously described features, but instead that someone skilled in the art can combine all of the described features as far as this makes sense technically.

LIST OF REFERENCE SYMBOLS

1—Vibration isolator
2—Base
3—Plate
4—Spring
5—Expansion bellows
6—Cooling-water inlet
7—Cooling-water outlet
8—Air feed
9—Terminals of sensors
10—Terminal of actuator
11—Motor
12—Sensor module
13—Seal
14—Seal
15—Geophone

The invention claimed is:

1. A pneumatic spring comprising:
at least one pneumatic spring that has an essentially fluid-tight chamber,
wherein a lower pressure relative to pressure in the fluid-tight chamber is generated between a vacuum-side seal and a pressure-side seal that are arranged one after another,
wherein an electronic module is arranged in the fluid-tight chamber, and wherein the pneumatic spring comprises electrical feed-throughs for the electronic modules; and
wherein the electronic module involves an actuator.

2. The pneumatic spring according to claim 1, wherein the pneumatic spring comprises a sensor.

3. The pneumatic spring according to claim 1, wherein the actuator is a motor.

4. The pneumatic spring according to claim 1, wherein an overpressure of more than 0.3 bar prevails in the fluid-tight chamber relative to the surroundings.

5. The pneumatic spring according to claim 1, wherein an overpressure from 0.5 to 15 bar prevails in the fluid-tight chamber relative to atmospheric pressure.

6. The pneumatic spring according to claim 1, wherein the pneumatic spring has a fluid inlet, and wherein the electronic module arranged in the fluid-tight chamber can be cooled at least partially by means of fluid.

7. The vibration isolator according to claim 1, wherein the pneumatic spring is constructed as a pneumatic mount.

8. An arrangement for a vibration isolator comprising at least one pneumatic spring according to claim 1, wherein the at least one pneumatic spring is arranged in a vacuum chamber.

9. The arrangement according to claim 8, wherein the vacuum chamber and/or the at least one pneumatic spring has fluid feedthroughs to the fluid-tight chamber.

* * * * *